Aug. 14, 1956 E. P. MIKLAU 2,758,797
TOOL FOR WINDING WIRE ON TERMINALS
Filed May 9, 1952 2 Sheets-Sheet 1
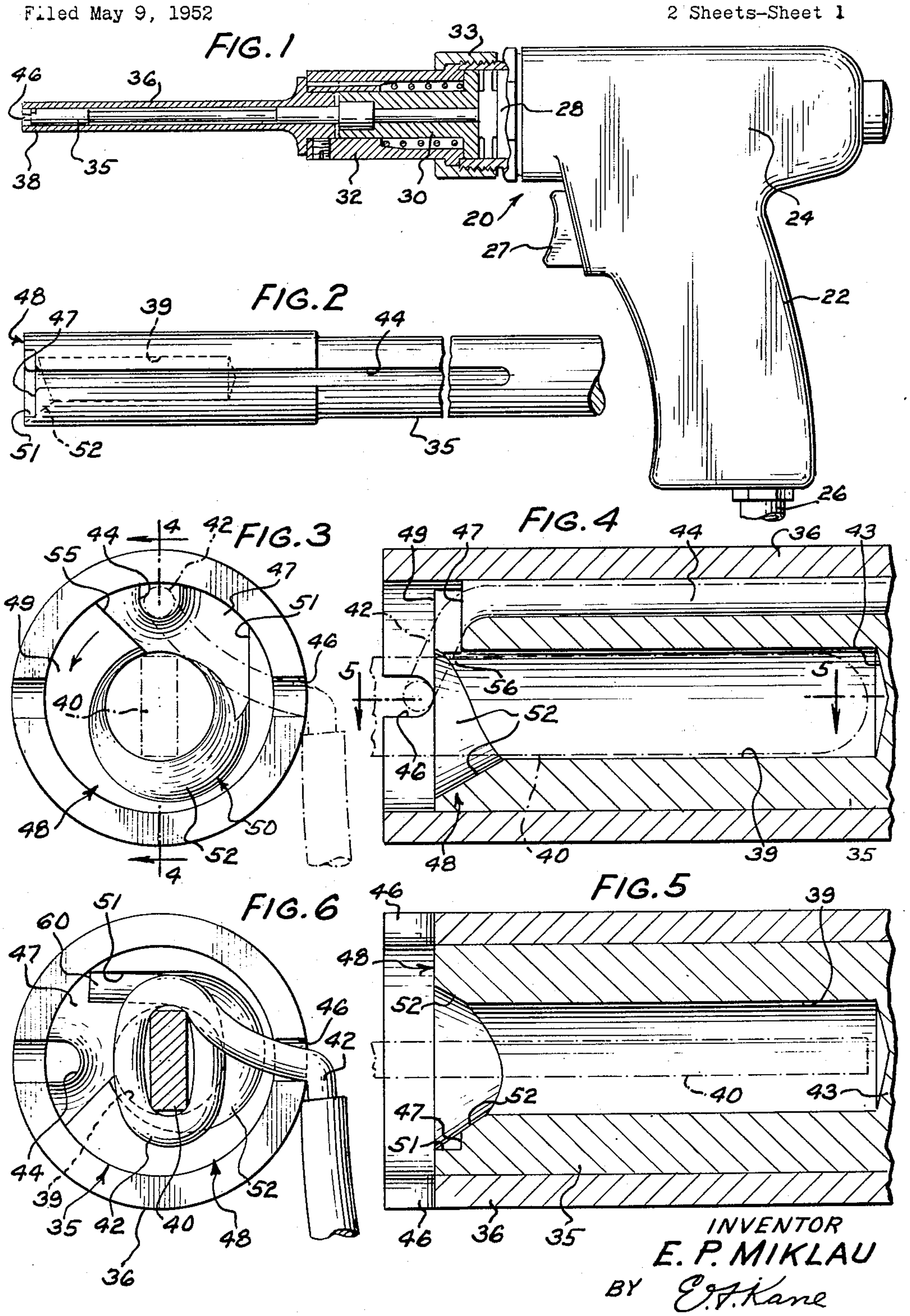
INVENTOR
E. P. MIKLAU
BY E. F. Kane
ATTORNEY Aug. 14, 1956 E. P. MIKLAU 2,758,797

TOOL FOR WINDING WIRE ON TERMINALS

Filed May 9, 1952 2 Sheets-Sheet 2

INVENTOR
E. P. MIKLAU
BY
ATTORNEY

United States Patent Office 2,758,797

Patented Aug. 14, 1956

1

2,758,797

TOOL FOR WINDING WIRE ON TERMINALS

Ernest P. Miklau, Chicago, Ill., assignor to Western Electric Company, Incorporated, New York, N. Y., a corporation of New York Application May 9, 1952, Serial No. 286,877

5 Claims. (Cl. 242—7)

This invention relates to a tool for winding a wire onto a terminal and more particularly to a tip of a wire winding tool for winding the wire and the end portion thereof tightly against a flat type terminal.

Although various tools have been made for winding connector wires onto terminals including the flat type terminals made from flat strip stock, the tools used heretofore for winding wires onto flat type terminals where the terminals are positioned close together have not been satisfactory in that they fail to wind the end portions of the wires tightly against the terminals. The ends of the wires thus wound extend outwardly from the terminals and frequently contact other ends of wires on adjacent terminals resulting in the short circuiting of parts of the electrical equipment associated therewith.

It is an object of the present invention to provide an effective and efficient wire winding tool for winding a wire and the end portion thereof tightly against a terminal.

In one embodiment of the invention as applied to a wire winding tool having a rotatable winding element, and a stationary sleeve for rotatably supporting the winding element and for supporting a connector wire to be wound onto a flat type terminal, there is provided in the winding element a central cylindrical bore extending from one end thereof for receiving the end portion of the terminal therein, and an eccentrically disposed recess extending from said one end parallel in spaced relation to the bore for receiving the end portion of the connector wire and for winding the wire onto the terminal as the winding element is rotated. A cam on the end of the winding element having curved and sloping portions engages the end portion of the wire as it leaves the wire receiving recess and urges the end of the wire radially inwardly against the terminal and also axially from the winding element to effect the wiping of the end of the wire into close relation with the flat terminal.

Other objects and advantages of the invention will become apparent from the following detailed description thereof and the accompanying drawings illustrating a preferred embodiment, in which Fig. 1 is a side elevational view of a wire winding gun with portions thereof in section and showing the improved wire winding element therein;

Fig. 2 is an enlarged plan view of a portion of the wire winding element;

Fig. 3 is an enlarged front elevational view of the wire winding element and the supporting sleeve encircling the element and indicating the terminal and the connector wire in dotted lines;

Fig. 4 is a vertical sectional view through a portion of the device taken on the line 4—4 of Fig. 3 indicating a terminal and a connector wire therein in dotted lines;

Fig. 5 is a horizontal sectional view taken on the line 5—5 of Fig. 4;

Fig. 6 is an end elevational view similar to Fig. 3 showing the winding element in changed position and the connector wire partly wound onto a terminal;

2

Figure 7:
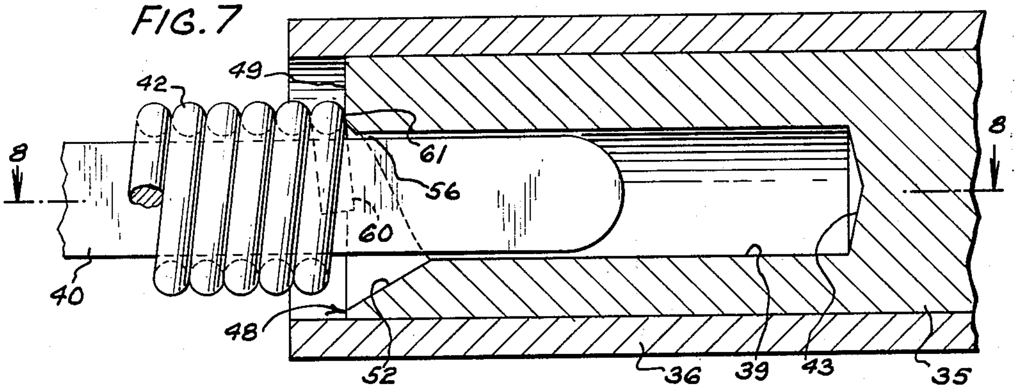
Figure 8:
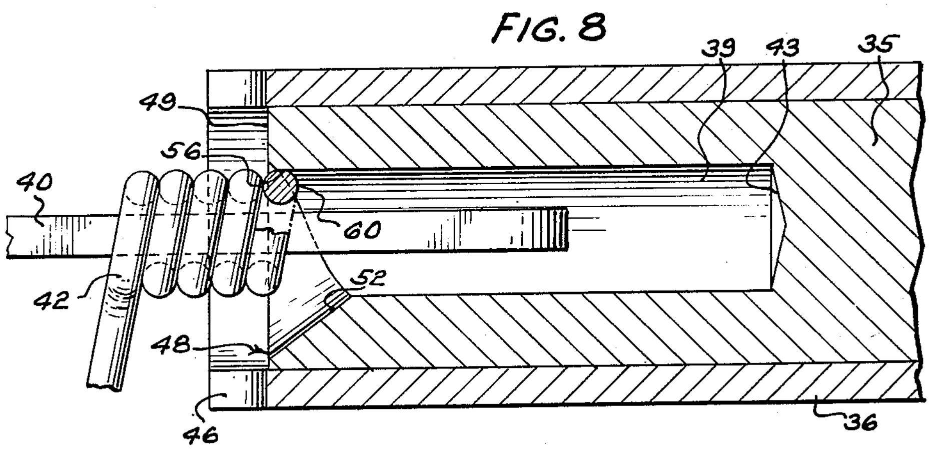
Figure 10:
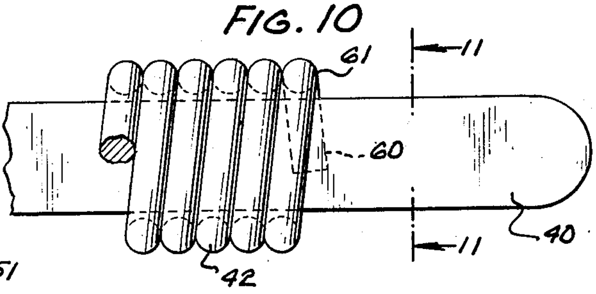
Figure 9:
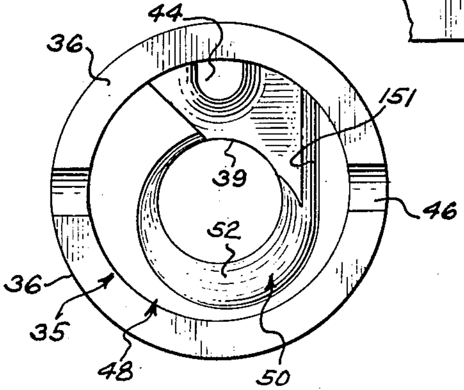
Figure 11:
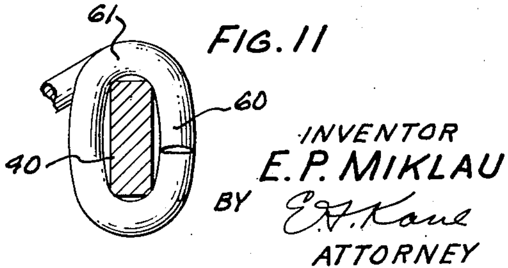

Fig. 7 is a view similar to Fig. 4 showing the parts thereof in changed position and the connector wire wound onto the terminal;

Fig. 8 is a horizontal sectional view of a portion of the winding tool similar to Fig. 5 showing the winding element in a changed position and showing a terminal therein and a connector wire wound thereon;

Fig. 9 is an end view of the device similar to Fig. 3 showing a modified embodiment of the invention; and Figs. 10 and 11 are side and sectional views, respectively, of a terminal with the connector wire wound thereon.

Referring to Fig. 1 of the drawings, the wire winding tool or gun 20 comprises a handle portion 22 at the upper end of which is formed a housing 24 enclosing an air motor (not shown) which is actuated from compressed air supplied through a line 26 under control of a valve 27. The air motor has a spring retracted clutch member 28 which is caused to rotate and move forward into engagement with a cooperating clutch member 30 in response to the actuation of the valve 27 to rotate the clutch member 30. The clutch member 30 is rotatably mounted in a stationary sleeve 32 which is removably secured to the housing 24 by a threaded collar 33. A winding tip or element 35 in the form of a shaft is secured to the clutch element 30 for rotation therewith and is rotatably supported in a stationary sleeve 36 which is secured to the stationary sleeve 32 and cooperates therewith to form a housing for the winding element 35.

The forward end of the winding element 35 is provided with a central cylindrical bore 39 extending in an axial direction from the end thereof for receiving the end portion of a flat type terminal 40 onto which a connector wire 42 is to be wound. The closed end 43 of the bore 39 forms a stop for limiting the inward movement of the terminal 40 and serves to locate the terminal and the winding tool a predetermined position relative to each other. An eccentrically disposed, longitudinally extending recess 44 is formed in the winding tip 35 in spaced and parallel relation to the bore 39 for receiving the end portion of the connector wire 42 therein. The recess 44 may be drilled into the winding tip but preferably is formed as a groove in the periphery thereof, which groove is closed by the housing 36. A predetermined length of the connector wire is adapted to be inserted into the recess 44 and the portion projecting outwardly therefrom is bent transversely of the tip and is supported in a notch 46 in the end portion of the supporting sleeve 36, which notch and end portion of the sleeve 36 are disposed beyond the end of the winding element 35. The forward end of the recess 44 is rounded and merges with a flat end wall 47 disposed in right angles to the winding element.

Formed on the end of the winding element 35 and extending axially beyond the end surface 47 is a cam member 48 having a flat surface 49 parallel to the end surface 47 and spaced therefrom a distance slightly less than the diameter of the connector wire 42. The cam member 48 has an irregular cam surface 50 adapted to engage the end portion of the wire and move it radially inwardly against the terminal and also move the end portion of the connector wire axially in a direction tending to move the terminal out of the bore 39. The cam surface 50 comprises a flat tangential portion 51 extending inwardly from the periphery of the winding element 35 and disposed perpendicularly to the end surface 47. At its point of tangency the surface 51 is spaced from the adjacent cylindrical wall of the bore 39 a distance greater than the diameter of the connector wire. The tangent portion 51 of the cam surface 50 merges with a curved sloping portion 52, successive portions of which are disposed progressively closer to the axis of rotation and progressively farther outwardly in an axial direction in the form of a helix. The cam 48 is so shaped that at the end portion 55 thereon the sloping curved surface 52 is relatively narrow and the cylindrical wall of the bore 39 extends axially beyond the end surface 47 of the winding element to form a wiping surface as indicated at 56. The winding element 35 is rotated in a counterclockwise direction as viewed from the end of the tool and as indicated by the arrow in Fig. 3.

In the operation of winding a connector wire 42 about the end of a flat type terminal 40 the end portion of predetermined length of a connector wire 42 is inserted in the wire receiving recess or groove 44 in the winding element 35 and the wire at the end of the groove 44 is bent transversely and is positioned in the notch 46 in the sleeve 36 where it is held by the left hand of the operator. The gun or winding tool 20 is moved with the connector wire 42 therein relative to the stationary terminal to cause the insertion of the end of the terminal 40 into the bore 39 of the winding element. With the tip 35 of the gun properly positioned relative to the terminal the valve 27 is actuated to cause the rotation of the winding element 35 to effect the winding of successive portions of the connector wire 42 tightly around the terminal. During the rotation of the winding element 35 as successive convolutions of the wire 42 are wound onto the terminal 40, there is axial movement of the tool 20 relative to the terminal whereby the terminal is progressively pushed outwardly from the bore 39 in response to the pressure of successive portions of the connector wire against the end wall 47 as the wire emerges from the groove 44.

After the end portion 60 of the connector wire 42 has been withdrawn from the groove 44 it is engaged successively by the portions 51 and 52 of the cam surface 50 which serve to wrap the end portion 60 tightly against the terminal 40. The curved and sloping portion 52 of the cam is so shaped that one component of force exerted thereby urges the end 60 of the wire radially inwardly against the terminal 40 and the other component of the cam urges the wire in an axial direction away from the gun 20. When the connector wire 60 is wound around the terminal 40 so that the end 60 of the wire is positioned against the wide face of the terminal as indicated in Fig. 8, the cam surface 52 serves to move the end 60 inwardly toward the terminal 40 to a position where the end 60 is engaged by the projecting portion 56 of the cylindrical bore 39 and is wiped thereby against the terminal 40 as shown in Fig. 8. As soon as the end 60 of the connector wire has been wiped against the terminal the rotation of the winding element may be stopped, but in practice the rotation continues for several revolutions before the winding element stops. During these several revolutions of the winding element the curved portion 61 of the endmost convolution of the wire 42 extending around the narrow edge portion of the terminal 40 is engaged by the sloping curved cam surface 52 which causes a relative axial movement between the connector wire 42 and the gun 20 which is yieldably urged against a wire by the operator. As the winding element 35 rotates, the curved portion 61 of the terminal wire 42 will ride from the sloping surface 52 onto the flat end portion 49 of the cam 48 and when the end 55 of the cam rides from under the portion 61 of the wire 42, the gun will be advanced until the flat surface 47 again engages the portion 61 of the wire 42 and this reciprocation of the gun will be effected for each revolution of the winding element until the winding element 35 comes to a stop.

The form of the cam 48 may vary from that shown in Fig. 3. It is not necessary that the cam be extended through the relatively long arc of the present embodiment, but it has been found that by providing a relatively long cam surface with a gradual slope the action is more gentle and smooth than when a short cam is used. In the embodiment of the winding tip illustrated in Fig. 9, the tangent portion 151 of the cam 48 is disposed at an angle relative to the axis of the winding element to provide a sloping surface similar to and forming a continuation of the sloping surface of the cam portion 52.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a tool for winding connector wires onto flat type terminals, the combination of a shaft, housing means including a tubular member for rotatably supporting said shaft, said tubular member extending axially beyond the end of said shaft and having a notch therein for supporting a connector wire to be wound onto said terminal, means for rotating said shaft, said shaft having a central cylindrical bore extending into one end thereof for receiving one end of said flat type terminal and having a recess extending longitudinally from said one end thereof in spaced and parallel relation to said bore for receiving the connector wire to be wound around said terminal, said shaft having a guide surface at said one end thereof extending transversely to the axis of said bore for guiding the wire from said recess onto the terminal, and a cam on the end of said shaft disposed in an axial direction beyond said transversely extending guide surface and having a curved and sloping surface engageable with the end portion of the connector wire as it leaves said slot for moving said end progressively inwardly toward the terminal and progressively axially outwardly from said shaft.

2. In a wire winding tool, a rotary winding element having a central cylindrical bore extending into one end thereof for receiving one end of a flat type terminal and having a recess extending into said element from said one end in spaced and substantially parallel relation to said bore for receiving the connector wire to be wrapped around said terminal, said element having a guide surface at one end thereof extending transversely to the axis of said bore for guiding the wire from said recess onto the terminal, and a cam member on said winding element extending axially beyond said guide surface and having the leading end portion thereof as said element rotates spaced radially farther from the axis of said bore than the other end thereof for engaging the end portion of the wire as it leaves said recess and camming it inwardly against said terminal, a portion of said cam being disposed in sloping relation to the axis of said bore for urging said wire axially from said winding element as said end portion of the wire is being wrapped around said terminal.

3. In a tool for winding a connector wire onto a flat terminal, the combination of a rotatable winding element having a central cylindrical bore extending into one end thereof for receiving one end of a flat type terminal and having a recess extending thereinto from said one end in spaced and parallel relation to said bore for receiving the end portion of the connector wire to be wrapped around said terminal, said winding element having a guide surface at one end thereof extending transversely to the axis of said bore for guiding the wire from said recess onto the terminal, a curved cam member on the end of said element extending in an axial direction beyond said transversely extending guide surface for engaging the end portion of the wire as it leaves said recess and having an end face spaced axially from said guide surface a distance slightly less than that of the diameter of the connector wire being wound, said cam having a cam surface spirally and slopingly arranged relative to the axis of said bore with successive portions of the cam surface disposed closer to the wall of said bore and axially progressively closer to the end face of said cam for moving the end of the wire progressively inwardly toward the terminal and axially toward the end face of said cam, means for supporting said winding element for rotation, means for rotating said winding element, and means engageable with an intermediate portion of said connector wire for supporting said portion of said wire against movement and in a position adjacent the end of said winding element.

4. In a tool for winding connector wires onto flat type terminals, the combination of a shaft, housing means including a tubular member for rotatably supporting said shaft, said tubular member extending axially beyond the end of said shaft and having a notch therein for supporting a connector wire to be wound onto said terminal, means for rotating said shaft, said shaft having a central cylindrical bore extending into one end thereof for receiving one end of said flat type terminal and having a recess extending into said one end thereof in spaced and substantially parallel relation to said bore for receiving the connector wire to be wound around said terminal, said shaft having a guide surface at said one end thereof extending transversely to the axis of said bore for guiding the wire from said recess onto the terminal, and a cam member on the end of said shaft extending axially beyond said guide surface and having the leading end portion thereof as said shaft rotates spaced radially farther from the axis of said bore than the trailing end thereof for engaging the end portion of the connector wire as it leaves said wire receiving recess and camming it inwardly against said terminal, a portion of said cam being disposed in sloping and helical relation to the axis of said bore for urging said wire axially outwardly from said shaft as said end portion of the wire is being wrapped around said terminal.

5. In a tool for winding connector wires onto flat type terminals, the combination of a shaft, housing means including a tubular member for rotatably supporting said shaft, said tubular member extending axially beyond the end of said shaft and having a notch therein for supporting a connector wire to be wound onto said terminal, means for rotating said shaft, said shaft having a central cylindrical bore extending into one end thereof for receiving one end of said flat type terminal and having a recess extending into said one end thereof in spaced and substantially parallel relation to said bore for receiving the connector wire to be wound around said terminal, said shaft having a guide surface at said one end thereof extending transversely to the axis of said bore for guiding the wire from said recess onto the terminal, and a cam member on the end of said shaft extending axially beyond said guide surface a distance substantially equal to that of the diameter of the connector wire being wound for engaging the end portion of the connector wire as it leaves said wire receiving recess, said cam having an end face and a curved and sloping surface successive portions of which latter are disposed progressively further axially from said guide surface for moving said end of the wire progressively inwardly toward the terminal and axially toward the end face of said cam.

References Cited in the file of this patent

UNITED STATES PATENTS

| | | |
|---|---|---|
| 2,585,010 | Hickman et al. | Feb. 12, 1952 |
| 2,649,251 | Nordell | Aug. 18, 1953 |